(12) United States Patent
Bunker et al.

(10) Patent No.: US 6,499,289 B1
(45) Date of Patent: Dec. 31, 2002

(54) PYROLYTIC GRAPHITE GAUGE FOR MEASURING HEAT FLUX

(75) Inventors: Robert C. Bunker, Ogden, UT (US); Mark E. Ewing, Perry, UT (US); John L. Shipley, Tremonton, UT (US)

(73) Assignee: Alliant Technologies Inc., Edina, MN (US)

( * ) Notice: Subject to any disclaimer, the term of this patent is extended or adjusted under 35 U.S.C. 154(b) by 0 days.

(21) Appl. No.: 09/820,403

(22) Filed: Mar. 29, 2001

Related U.S. Application Data

(60) Provisional application No. 60/193,457, filed on Mar. 31, 2000.

(51) Int. Cl.$^7$ ................................................ F02K 9/08
(52) U.S. Cl. ............................ 60/253; 60/257; 60/803; 374/144; 374/148
(58) Field of Search ................................ 374/144, 148; 60/253, 257, 803

(56) References Cited

U.S. PATENT DOCUMENTS 3,940,067 A  *  2/1976  Cherry ................... 239/265.11
5,444,327 A     8/1995  Treseder et al.

OTHER PUBLICATIONS

Holman, P.J., "Experimental Methods for Engineers", McGraw–Hill Kogakusha, Tokyo, 1971, pp. 313–315.*
Measurement of Convective and Radiative Heat Fluxes at the Surface of an Ablative Material, ISA Transactions, vol. 9, No. 2, pp. 95–103 (1970).
"Shell develops new heat–flowmeter," The Oil and Gas Journal, pp. 121, 124–25 (Jul. 1, 1968).
SFS STD 101–C BF Goodrich Pyrolytic Graphite Specification (3 pages).
Micro–Foil Heat Flux Sensors brouchure (1998).
Medtherm Corp. brochure (1992).

* cited by examiner

*Primary Examiner*—Ehud Gartenberg
(74) *Attorney, Agent, or Firm*—Sullivan Law Group

(57) ABSTRACT

A gauge for measuring heat flux, especially heat flux encountered in a high temperature environment, is provided. The gauge includes at least one thermocouple and an anisotropic pyrolytic graphite body that covers at least part of, and optionally encases the thermocouple. Heat flux is incident on the anisotropic pyrolytic graphite body by arranging the gauge so that the gauge surface on which convective and radiative fluxes are incident is perpendicular to the basal planes of the pyrolytic graphite. The conductivity of the pyrolytic graphite permits energy, transferred into the pyrolytic graphite body in the form of heat flux on the incident (or facing) surface, to be quickly distributed through the entire pyrolytic graphite body, resulting in small substantially instantaneous temperature gradients. Temperature changes to the body can thereby be measured by the thermocouple, and reduced to quantify the heat flux incident to the body.

20 Claims, 4 Drawing Sheets

PYROLYTIC GRAPHITE GAUGE FOR MEASURING HEAT FLUX

CROSS-REFERENCE TO RELATED APPLICATION

The benefit of priority of claimed of U.S. Provisional Application No. 60/193,457 filed in the U.S. Patent & Trademark Office on Mar. 31, 2000, the complete disclosure of which is incorporated herein by reference.

GOVERNMENT LICENSING CLAUSE

The U.S. Government has a paid-up license in this invention and the right in limited circumstances to require the patent owner to license others on reasonable terms as provided for by the terms of contract NAS 8-97238 awarded by the National Aeronautics and Space Administration (NASA).

BACKGROUND OF THE INVENTION

1. Field of the Invention

The present invention relates to a gauge for measuring heat fluxes, especially in high temperature, highly corrosive environments. In particular, the present invention relates to a gauge for measuring heat fluxes in rocket motor nozzles, including sub-scale and full-scale rocket motor nozzles, heat shields of re-entry vehicles, rocket motor combustion chambers, and metal processing. This invention also relates to a method of measuring heat fluxes with the gauge in various high temperature, corrosive environments.

2. Description of the Related Art

Solid rocket motors typically include an outer case or shell housing a solid propellant grain which, in the case of a hybrid motor, is a solid fuel or oxidizer grain. The rocket motor case is conventionally manufactured from a rigid, yet durable, material such as steel or filament-wound composite. The propellant is housed within the case. There are several basic propellant grain configurations known in the art (and compatible with the use of this invention) for loading propellant within the case. The two most commonly used configurations are the center-perforated grain configuration and the end burning grain configuration. In the center-perforated grain configuration, the flame front advances radially from the center perforation towards the outer case. On the other hand, in the end-burning grain configuration the flame front advances axially from the nozzle end of the motor towards the forward dome.

During firing, oxidizing agents of the propellant serve to drive combustion reactions in a combustion chamber to form large quantities of combustion products, which are expelled from the rocket motor through a nozzle in fluid communication with the combustion chamber. Nozzles are designed to accelerate the combustion product gases from the propellant grain to the maximum velocity at the exit. To achieve this end, nozzles usually have forward walls converging to a restricted throat region and aft walls diverging from the throat region to a larger exit area, thus defining a converging/diverging contoured pathway. The nature of compressible gases is such that a converging/diverging nozzle increases the exit gas velocity and thereby thrust. The proportions of the mass flow pathway, particularly the ratio of area at the exit plane to area at the throat, establish how efficiently the nozzle converts pressure in the mass flow stream to thrust produced by the motor. It is within the purview of those skilled in the art to design a nozzle throat to optimize the ratio of exit area to throat area.

During operation, combustion of solid rocket propellant generates extreme conditions within the case and along the contoured nozzle pathway of the rocket motor. For example, temperatures inside the rocket motor case can exceed 2760° C. (5,000° F.), and interior pressures can exceed 1,500 psi. These factors combine to create a high degree of turbulence for particles entrained in the combustion gases.

A heat insulating layer (insulation) protects the rocket motor case from the hot gas and highly erosive particle streams generated by the combusting propellant. Typically, the propellant grain is bonded to the insulation and/or non-insulated portions of the case by use of a lining layer (liner). In addition to its adhesive function of bonding the propellant to the insulation and any non-insulated portions of the case, the liner also supplements the insulator by functioning to inhibit the burning surface of the propellant grain when the propellant/liner interface is exposed to an approaching flame front. Additionally, the liner isolates propellant within the case from the environment and prevents leakage of combustion gases or liquid into or through the case.

Likewise, the contoured nozzle pathway, including the restricted nozzle region, must also be insulated to withstand the elevated temperatures and pressures of the combustion products, as well as the erosive effects of turbulent particles entrained within the combustion gas. Carbon-based and silica-based ablative materials are highly advantageous for use as nozzle insulation due to their excellent ablative properties, low cost, and relatively light weight.

It is widely acknowledged in the industry, however, that carbon-and silica-based insulation and ablative materials, such as those present at case insulation-to-propellant interfaces and those defining nozzle contour pathways, are highly susceptible to recession at high operating temperatures. Convective and radiative heating of the ablative materials by the combustion products increases the vulnerability of the ablative materials to recession. As incident heat is conducted to the nozzle throat ablative material, the ablative material tends to decompose into pyrolysis gases and residual carbon, which are carried away with the propellant combustion gases. If not accounted for, the recession of the nozzle throat inner surface during motor operation may become a source of several problems in rocket operation, including decreased efficiency and loss of predictability.

Thus, the design of rocket insulation, including the selection of an appropriate ablative materials and insulation thickness, is dependent upon the convective and radiative heat fluxes incident on ablative surfaces at various locals in rocket motors and nozzles. Because no reliable measuring technique has heretofore been known for determining actual heat fluxes, heat fluxes are usually estimated by modeling based on data obtained from such techniques as computational fluid dynamics.

The criticality of predication accuracy is demonstrated by the severity and magnitude of the risk of failure due to erosion. Most insulation is, of necessity, "man-rated" in the sense that a catastrophic failure can result in the loss of human life—whether the rocket motor is used as a booster for launch of a manned rocket or is carried tactically underneath the wing of an attack aircraft. The monetary cost of failure in satellite launches is well-publicized and can run into the hundreds of millions of dollars. Additionally, as mentioned above, unforeseen amounts of recession in the nozzle throat insulation can significantly affect the flow expansion contour in the nozzle, affecting motor performance.

For these reasons, there is a strong desire in the art to validate heat flux predictions through actual measurement of the convective and radiative heat fluxes incident on the ablative surfaces of rocket motors and nozzles. As described in Wool et al., "Measurement of Convective and Radiative Heat Fluxes at the Surface of an Ablative Material" (1970), thermocouples have been proposed for validating heat flux predictions. Wool et al. state that thermocouples used for this purpose should be capable of accurately measuring the high temperatures encountered in rocket motor materials and, because ablative material recedes and decomposes, should be capable of obtaining sufficient data for a continuous evaluation of the heat flux. Additionally, the gauge must be capable of withstanding the high operating temperatures to which it is exposed for a sufficient time to obtain heat flux data. Although the gauges disclosed in Wool et al. reportedly attain these objects, the structure of the Wool et al. thermocouple devices requires that data reduction be done by a complex analytical technique in which assumptions are made concerning phenomena such as surface thermochemical reactions, transient heat conduction, and in-depth pyrolysis gas generation.

SUMMARY OF THE INVENTION

It is, therefore, an object of this invention to provide a gauge capable of measuring either heat fluxes (convective and radiative fluxes) or radiative fluxes at a rocket motor ablative surface with sufficiently high accuracy and for a sufficiently long period of time to permit validation of known prediction models, without the need for complex analytical data reduction.

In accordance with the principles of this invention, the above and other objects are attained by a novel gauge for measuring heat flux, especially heat flux encountered in a high temperature environment, such as a rocket motor. The gauge comprises at least one thermocouple and an anisotropic pyrolytic graphite body that covers at least part of, and optionally encases, the thermocouple. The anisotropic pyrolytic graphite provides a body on which heat flux is incident, so that changes in temperature to the body can be measured by the thermocouple. These measurements can then be reduced to quantify the heat flux incident to the body. In the event that the thermocouple is encased in an anisotropic pyrolytic graphite body, a bore may be formed in the body for permitting the thermocouple to be inserted into the body and for providing a pathway for lead wires of the thermocouple. The bore can be filled with, for example, boron nitride.

Pyrolytic graphite has a series of basal planes, in which carbon atoms are arranged in repeating hexagonal patterns. The direction in which the planes extend is commonly referred to as the "a" direction or the "a–b" plane. Individual basal planes are stacked one upon another along a direction perpendicular to the basal planes which is commonly known as the "c" direction. Unlike single-crystal graphite in which the planes are ordered, the planes are arranged somewhat randomly for pyrolytic graphite.

Pyrolytic graphite is characterized as anisotropic because the properties of pyrolytic graphite along the "a" direction differ greatly from the properties of pyrolytic graphite along the "c" direction. For example, pyrolytic graphite exhibits high tensile strength, low thermal expansion, and, most importantly for the present invention, high thermal conductivity in the "a" direction along the basal planes. On the other hand, the thermal conductivity of pyrolytic graphite in the "c" direction has been reported to be about 0.59 Btu/ft/hr/° F. (at 2000° F.), which is less than 1% of the reported thermal conductivity of 114 Btu/ft/hr/° F. (at 2000° F.) for pyrolytic graphite in the "a" direction.

By arranging the gauge so that the gauge surface on which convective and radiative fluxes are incident is perpendicular to the basal planes of the pyrolytic graphite, the conductivity of the pyrolytic graphite permits energy, transferred into the pyrolytic graphite body in the form of heat flux on the incident (or facing) surface, to be quickly distributed through the entire pyrolytic graphite body, resulting in small substantially instantaneous temperature gradients. As a result, measurements of the rate of temperature change are simplified, no matter at what depth (or height) in the gauge that the thermocouple is disposed, since the rate of temperature change will be substantially uniform throughout the entire pyrolytic graphite body.

The gauge of this invention is especially useful for permitting measurement of heat fluxes along nozzle surfaces defining contoured pathways, such as diverging/converging pathways. The gauge can also be used in other regions of a rocket motor, such as the aft dome, combustion chamber, or interface between the case insulation and propellant grain. It is also within the scope of this invention to use the gauge for measuring rates of temperature changes caused by heat fluxes at heat shields of reentry vehicles or other regions of vehicles exposed to high heat flux. The gauge also finds applicability in other technologies, including, for example, metal processing.

Other objects, aspects, and advantages of this invention will become more apparent to those skilled in the art upon reading the specification and appended claims which, when taken in conjunction with the accompany drawing, explain the principles of this invention.

BRIEF DESCRIPTION OF THE DRAWINGS

The accompanying drawings serve to elucidate the principles of this invention. In such drawings.

DETAILED DESCRIPTION OF THE INVENTION

Figure 1:
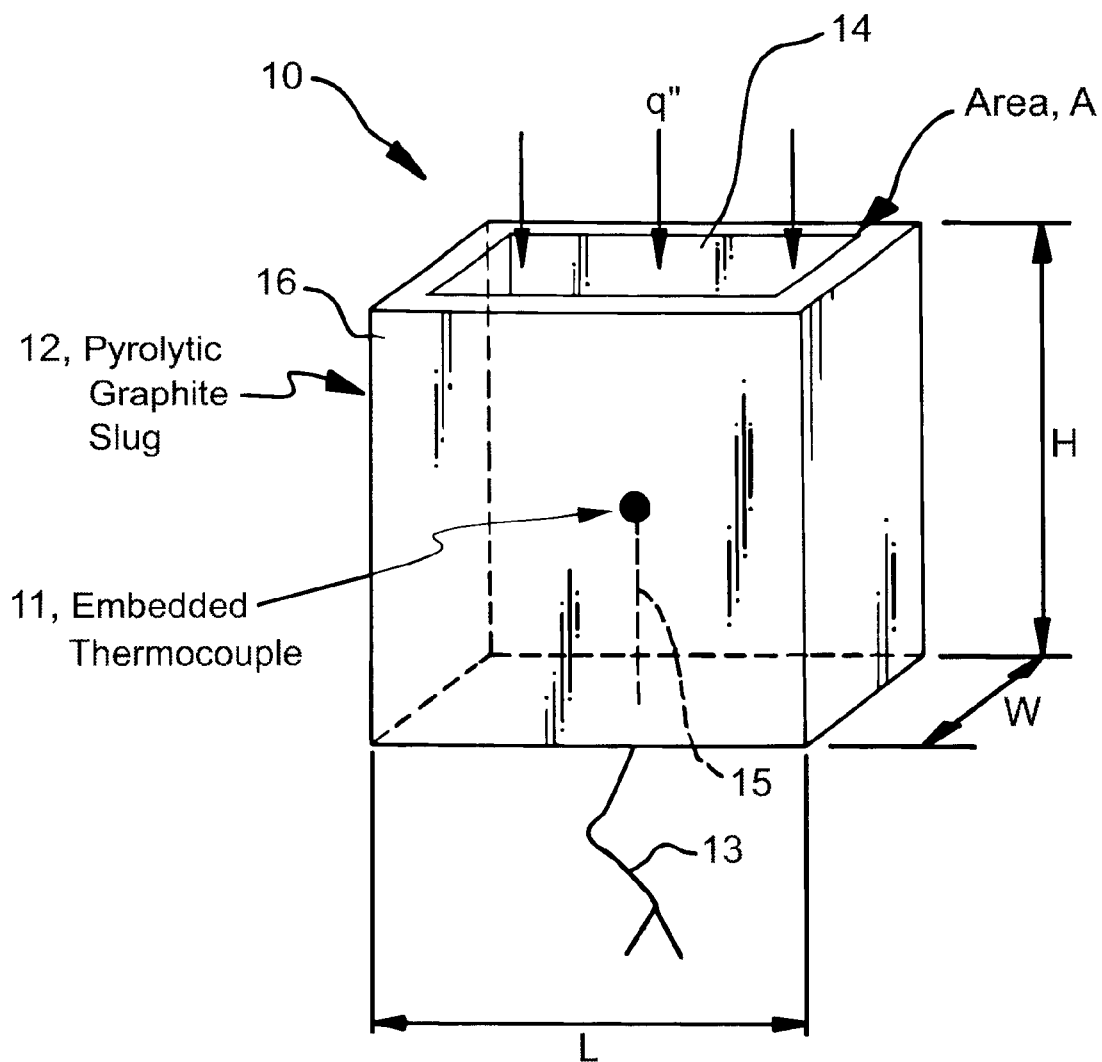
FIG. 1 is a schematic, partially phantomed view of a gauge according to an embodiment of this invention.

Referring now more particularly to the drawings, there is shown in FIG. 1 a gauge, which is generally represented by reference numeral 10 and is constructed in accordance with an embodiment of this invention. The gauge 10 comprises a thermocouple 11 encased within a pyrolytic graphite body 12. Lead wires 13 connect the thermocouple 11 to a recording device (not shown) for the purpose of storing the temperature of the thermocouple (and, therefore, the temperature of the pyrolytic graphite body) as a function of time, from which the total heat flux can be determined.

The gauge 10 has a height H, a width W, and a length L. In use, the gauge 10 is arranged so that surface 14 of the gauge 10 faces and is exposed to the environment to be measured. The surface of the device on which the heat flux to be measured is incident, e.g., surface 14 in FIG. 1, is hereinafter referred to as the facing surface. For example, a gauge positioned along the contoured nozzle pathway would have the facing surface thereof flush with the exposed surfaces of the surrounding ablative material.

Intermittent line 15 represents a bore formed in the pyrolytic graphite body 12 for inserting the thermocouple 11 therein and running the lead wires 13 to the recording device. The bore 15 can be filled with a conductive filler, such as boron nitride, and sealed with a suitable sealant, including epoxies such as Graphibond 669, available from Aremco Products, Inc. Alternatively, the pyrolytic graphite body 12 may be in-situ deposited around the thermocouple 11 and lead wires 13.

The design of the gauge 10 takes advantage of the properties of pyrolytic graphite, including the high thermal and anisotropic thermal conductivities of pyrolytic graphite, and the resistance of pyrolytic graphite to extreme thermal and chemical corrosive environments. Due to the anisotropic thermal conductivity of pyrolytic graphite, pyrolytic graphite is very conductive along the direction of its basal plane (i.e., along the a–b plane), but non-conductive along the c-direction. Referring to FIG. 1, the basal planes are arranged parallel to front surface 16, so that the facing surface 14 is perpendicular to the basal planes (and thus parallel to the c-axis of the pyrolytic graphite). As a consequence, the pyrolytic graphite body 12 is conductive along dimensions H and L, thus permitting energy to be distributed throughout the entire body 12 substantially instantaneously. The total incident heat flux is evaluated from the thermal measurements taken, as a function of time, by the thermocouple 11 of the gauge 10. The dimension L is preferably relatively large to substantially negate temperature gradients caused by thermal communication with ablative material adjacent to the sides of the gauge 10 along direction L. On the other hand, because the pyrolytic graphite body 12 is much less conductive along the W dimension, i.e., the c-axis, the width of the body 12 may be relatively small. Temperature gradients between the body 12 and ablative materials adjacent to the sides of the gauge 10 along the direction W are substantially negated from detection by the thermocouple 11 due to the low thermal conductivity of the body 12 along the c-direction.

The thermal conductivity of pyrolytic graphite is sufficiently high to satisfy two important conditions. First, the specific heat determined from the temperature measured by the thermocouple 11 at the middle of the pyrolytic graphite body 12 is representative of the average value in the H direction, thus reducing or eliminating temperature gradients along the height H of the body 12. Second, the change in temperature with respect to time, dT/dt, as measured by the thermocouple 11 at the middle of the body 12, is representative of the overall average rate of temperature change in the body 12.

An energy balance over area A, which as shown in FIG. 1 is defined as the area of the facing surface 14 having negligible temperature gradients in the W and L directions, is as follows:

$$Q = mc_p \, dT/dt \quad (1)$$

or $$q''A = (\rho A H) c_p \, dT/dt \quad (2)$$

or $$q'' = (\rho H) c_p \, dT/dt \quad (3),$$

in which Q is the total heat transfer rate resulting from convective and radiative heat transfer at the surface, q" is heat flux (both conductive and radiative), $\rho$ is density of the pyrolytic carbon, H is the height of the gauge, and $c_p$ is measured specific heat (energy/part by weight to raise the material one degree in temperature). Thus, by taking temperature measurements as a desired frequency with the gauge to ascertain dT/dt, heat flux q" can be calculated.

Figure 2:
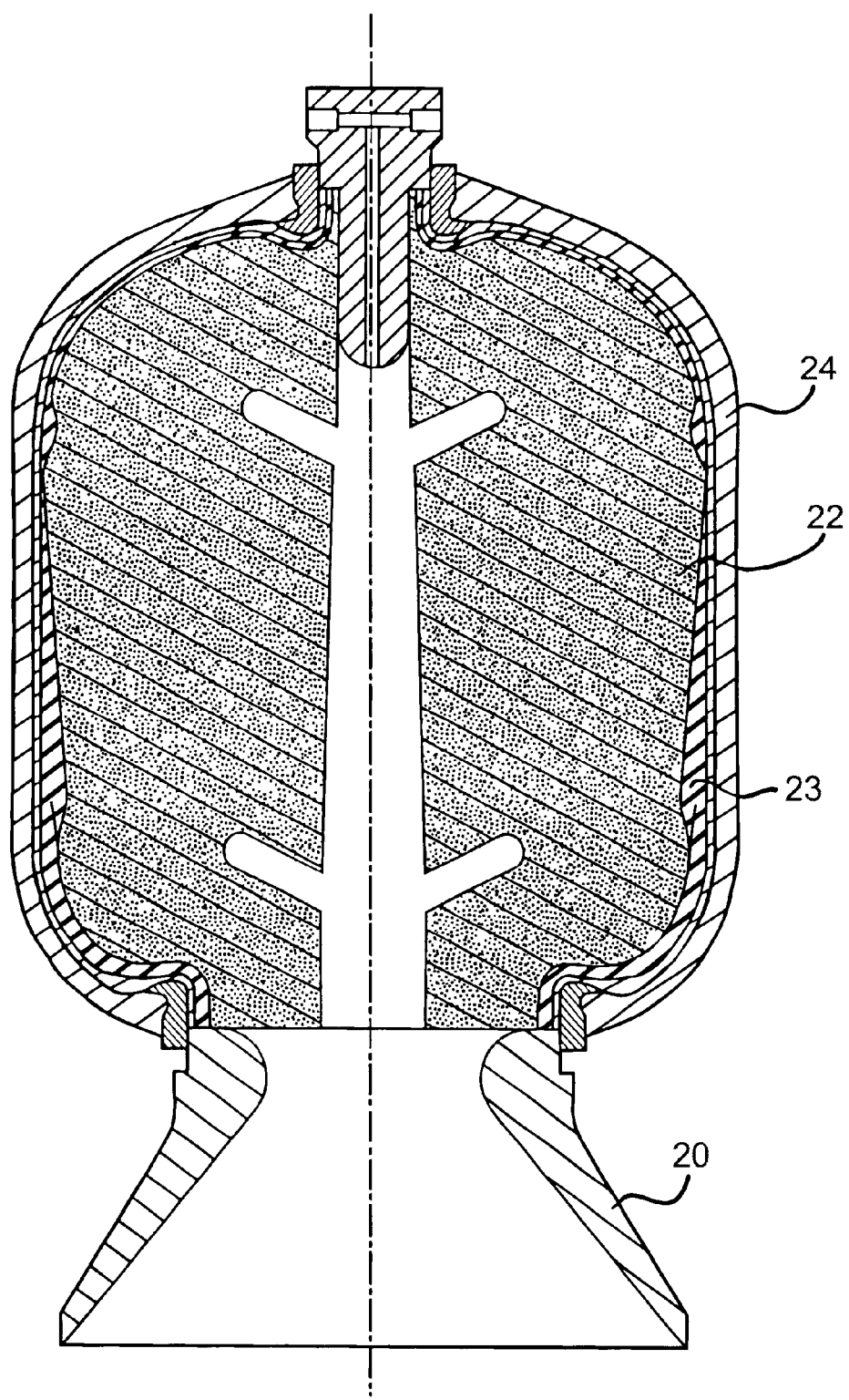
FIG. 2 is a schematic cross sectional view of a solid rocket motor assembly in which the gauge of this invention can be used to measure convective and radiative fluxes.
Figure 3:
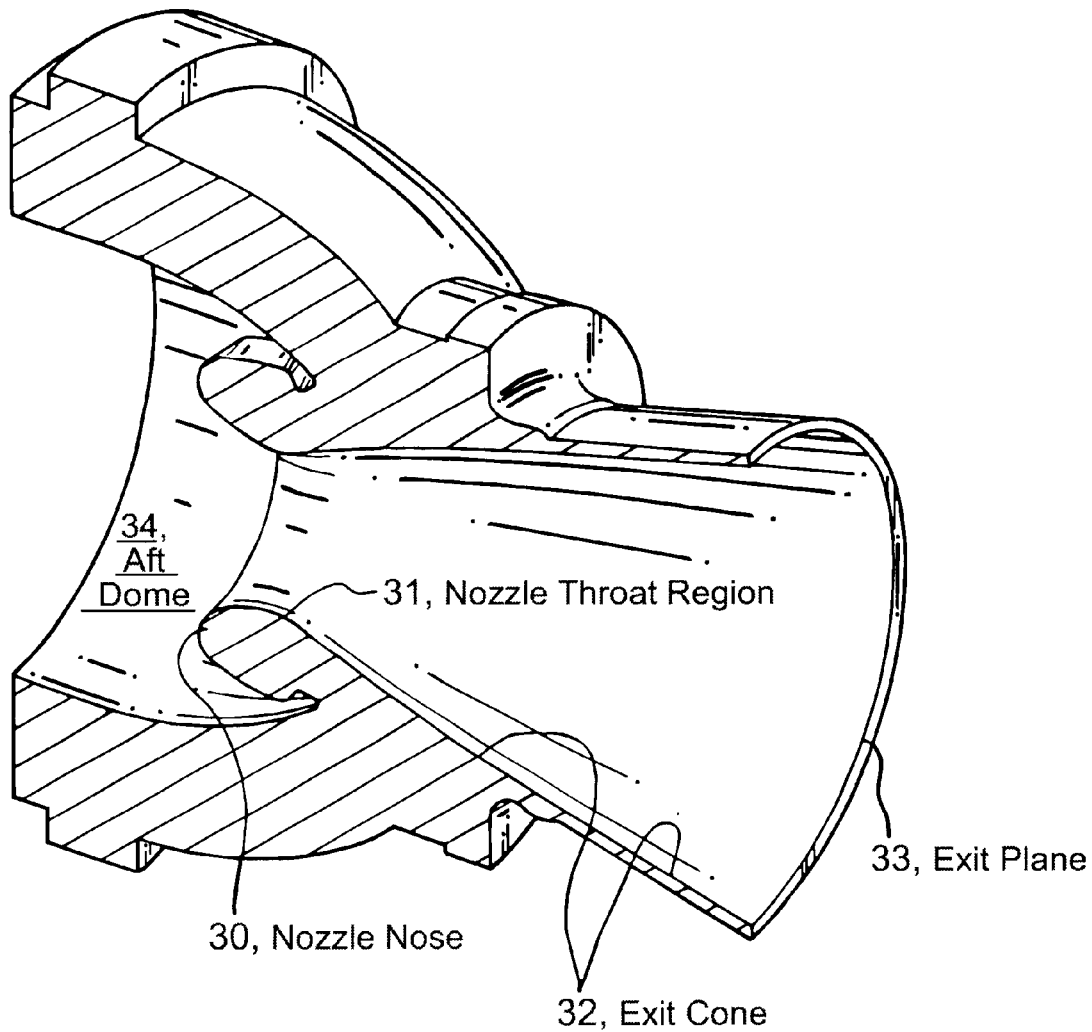
FIG. 3 is an enlarged sectional, perspective view of a nozzle of a rocket motor assembly, showing the interior contoured nozzle surface along which the gauge of this invention can be positioned to measure rates of temperature change, from which heat fluxes or radiative fluxes are reduced.

Referring now more particularly to FIGS. 2 and 3, the gauge 10 can be placed at one or more positions along the nozzle contour-defining surface of the nozzle 20, including at the nozzle nose 30, the nozzle throat region 31, the exit cone 32, and/or the exit plane 33. Preferably, the facing surface 14 of the gauge 10 is made flush with the contoured nozzle surface by forming a small recess into the contoured nozzle surface and inserting the gauge 10 into the recess. Similarly, the gauge 10 may be placed into insulation at the aft dome 34 or into insulation 22 positioned between the rocket motor case 23 and the solid propellant grain 24.

The thermocouple 11 is preferably a Type "K" thermocouple, which contains two metal 3 mil wires of Chromel® (90% nickel/10% chromium) and Alumel® (95% nickel/2% aluminum/2% manganese/1% silicon), respectively, with 0.003 inch wires. Other types of thermocouples can be used in this invention, depending upon the heat flux range and duration of heat anticipated. Other suitable thermocouple types include, by way of example, Type E (Chromel-Constantan®), Type J (Iron-Constantan®), Type R (Platinum-Rhodium), Type S (Platinum-Rhodium), and Type B (Platinum-Rhodium).

A suitable pyrolytic graphite material is SFS STD 101-C, available through BF Goodrich.

The gauge is assembled by drilling a hole in pyrolytic graphite body 12, and injecting a boron nitride slurry comprising boron nitride and water into the bore. The thermocouple is inserted into the bore with some clearance between the bore-defining walls and thermocouple. The bore is then sealed with an epoxy. Prior to sealing with the epoxy, the gauge is preferably baked to remove any residual water from the boron nitride slurry. If the water is not removed, heat of vaporization generated while using the gauge 10 can cause additional thermodynamic effects, not accounted for in equations (1)–(3), resulting in erroneous reduction of heat flux from the temperature response.

Various modifications and variations can be made to the embodiment illustrated in FIG. 1. By way of example, although the pyrolytic graphite body 12 of the gauge 10 is shown having a parallelepiped configuration, the body can undertake other configurations, including spherical, oblate spherical, polygonal, other non-random shapes and configurations, and random configurations. Thus, the facing surface 14 of the gauge 10 does not have to be flat.

Additionally, in the illustrated embodiment the thermocouple 11 is positioned at the midpoint or center of the pyrolytic graphite body 12. It is to be understood, however, that the thermocouple 11 may be positioned at locations in the body 12 other than the midpoint or center. Although less preferred, a portion of the thermocouple may be exposed or partially exposed at a surface (other than the facing surface) of the pyrolytic graphite body 12. If the thermocouple is not positioned at the center of the pyrolytic graphite body 12, however, then the rate of temperature change measured by the thermocouple will not necessarily be the average rate of temperature change in the pyrolytic graphite body 12.

Although the illustrated embodiment has been discussed in connection with a thermocouple 11 capable of taking convective and radiative heat flux measurements, it is to be understood that a gauge measuring radiative heat flux only could be used, with, for example, a sapphire window to transmit only radiation to the gauge.

The following example serves to explain embodiments of the present invention in more detail. The example is not to be construed as being exhaustive or exclusive as to the scope of this invention.

EXAMPLE

A gauge was prepared having a Type K thermocouple embedded in the center of a pyrolytic graphite body. The gauge had dimensions measuring 1.27 cm (0.5 inch) in height (H), 1.27 cm (0.5 inch) in length (L), and 0.48 cm (0.19 inch) in width (W). The bore into which the gauge was inserted was filled with boron nitride, then baked to dry the gauge. The gauge was subject to a known incident radiation flux of 200 W/cm$^2$, and data was recorded at a frequency of 50 Hz (50 readings per second). The results are shown in FIG. 4.

Figure 4:
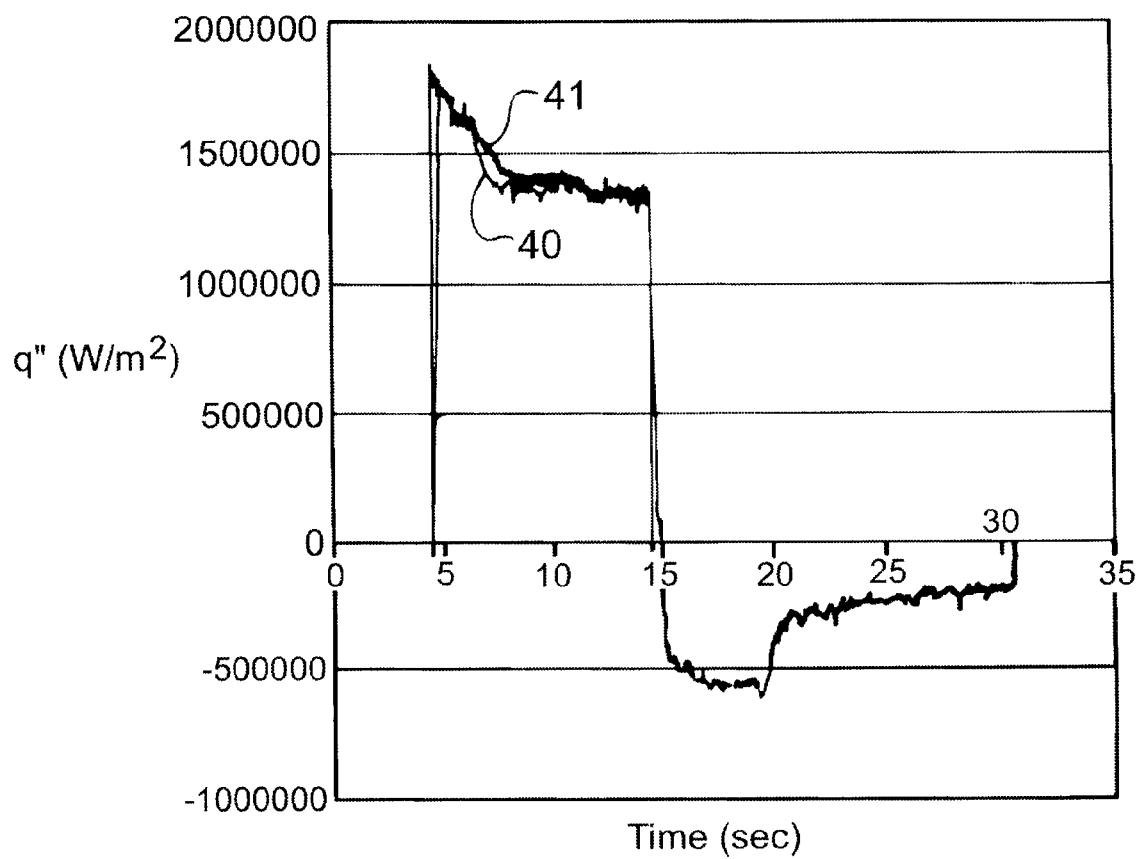
FIG. 4 is a graph comparing a known heat flux to a heat flux q" (W/mm$^2$) measured as a function of time (seconds) with a gauge according to the present invention.

In FIG. 4, curve 40 represents the actual absorbed flux, which was calculated as the incident value multiplied by the absorptivity of the material. (Absorptivity was measured over a 8–12 micron band, since the incident flux of the LHMEL laser had a wavelength of 10.6 microns, giving a measurement of $\alpha=0.74\pm0.01$.) Curve 41 represents the heat flux calculated based on measurements of the gauge. As evident from FIG. 4, curves 40 and 41 substantially overlap, thus validating the accuracy of the gauge.

The foregoing detailed description of the invention has been provided for the purpose of explaining the principles of the invention and its practical application, thereby enabling others skilled in the art to understand the invention for various embodiments and with various modifications as are suited to the particular use contemplated. This description is not intended to be exhaustive or to limit the invention to the precise embodiments disclosed. Modifications and equivalents will be apparent to practitioners skilled in this art and are encompassed within the spirit and scope of the appended claims.

We claim:

1. A flux measurement gauge for measuring heat flux or radiative flux, the gauge comprising:
   at least one thermocouple; and
   an anisotropic pyrolytic graphite body covering at least a portion of the thermocouple, the anisotropic pyrolytic graphite body comprising pyrolytic graphite having a plurality of basal planes substantially parallel with an "a" direction and arranged adjacent to each other in a "c" direction.

2. The flux measurement gauge of claim 1, wherein the thermocouple is substantially encased by the anisotropic pyrolytic graphite body.

3. The flux measurement gauge of claim 2, wherein the thermocouple is positioned at the center of the anisotropic pyrolytic graphite body.

4. The flux measurement gauge of claim 2, wherein the anisotropic pyrolytic graphite body has a bore therein through which lead wires of the thermocouple extend.

5. The flux measurement gauge of claim 4, wherein the bore is filled with boron nitride.

6. The flux measurement gauge of claim 1, wherein the anisotropic pyrolytic graphite body is shaped as a parallelepiped.

7. A rocket motor comprising:
   a nozzle;
   a case operatively connected to the nozzle;
   ablative material insulating the case and the nozzle; and
   at least one gauge for measuring heat fluxes or radiative fluxes at the ablative material, the gauge comprising
      at least one thermocouple; and
      an anisotropic pyrolytic graphite body covering at least a portion of the thermocouple, the anisotropic pyrolytic graphite body comprising pyrolytic graphite having a plurality of basal planes substantially parallel with an "a" direction and arranged adjacent to each other in a "c" direction.

8. The rocket motor of claim 7, wherein the thermocouple is substantially encased by the anisotropic pyrolytic graphite body.

9. The rocket motor of claim 8, wherein the thermocouple is positioned at the center of the anisotropic pyrolytic graphite body.

10. The rocket motor of claim 8, wherein the anisotropic pyrolytic graphite body has a bore therein through which lead wires of the thermocouple extend.

11. The rocket motor of claim 10, wherein the bore is filled with boron nitride.

12. The rocket motor of claim 7, wherein the anisotropic pyrolytic graphite body is shaped as a parallelepiped.

13. A method of measuring heat fluxes or radiative fluxes at an incident surface, the method comprising measuring changes in temperature per time with a gauge comprising at least one thermocouple and an anisotropic pyrolytic graphite body covering at least a portion of the thermocouple, the anisotropic pyrolytic graphite body comprising pyrolytic graphite having a plurality of basal planes substantially parallel with an "a" direction and arranged adjacent to each other in a "c" direction.

14. The method of claim 13, wherein the thermocouple is substantially encased by the anisotropic pyrolytic graphite body.

15. The method of claim 14, wherein the thermocouple is positioned at the center of the anisotropic pyrolytic graphite body.

16. The method of claim 14, wherein the anisotropic pyrolytic graphite body has a bore therein through which lead wires of the thermocouple extend.

17. The method of claim 16, wherein the bore is filled with boron nitride.

18. The method of claim 13, wherein the anisotropic pyrolytic graphite body is shaped as a parallelepiped.

19. The rocket motor of claim 7, wherein the ablative material has an incident surface facing a central axis of the case and the nozzle, and wherein the basal planes are arranged perpendicular to the incident surface.

20. The method of claim 13, further comprising arranging the gauge to orient the basal planes perpendicular to the incident surface.

* * * * *

UNITED STATES PATENT AND TRADEMARK OFFICE
CERTIFICATE OF CORRECTION

PATENT NO.   : 6,499,289 B1  Page 1 of 1
DATED        : December 31, 2002
INVENTOR(S)  : Robert C. Bunker, Mark E. Ewing and John L. Shipley It is certified that error appears in the above-identified patent and that said Letters Patent is hereby corrected as shown below:

<u>Title page,</u>
Item [73], Assignee, please change "Alliant Technologies Inc." to
-- Alliant Techsystems Inc. --

Signed and Sealed this

Twenty-third Day of December, 2003

JAMES E. ROGAN
*Director of the United States Patent and Trademark Office*